United States Patent
Bauer

(10) Patent No.: US 10,800,456 B2
(45) Date of Patent: Oct. 13, 2020

(54) SUBFRAME FOR A REAR AXLE OF A MOTOR VEHICLE

(71) Applicant: Dr. Ing. h.c. F. Porsche Aktiengesellschaft, Stuttgart (DE)

(72) Inventor: Lutz Bauer, Wiernsheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 188 days.

(21) Appl. No.: 15/956,229

(22) Filed: Apr. 18, 2018

(65) Prior Publication Data
US 2018/0346030 A1   Dec. 6, 2018

(30) Foreign Application Priority Data

Jun. 1, 2017   (DE) .......................... 10 2017 112 049

(51) Int. Cl.
| | | |
|---|---|---|
| *B62D 21/11* | (2006.01) | |
| *B60G 21/055* | (2006.01) | |
| *B62D 7/22* | (2006.01) | |
| *B62D 7/00* | (2006.01) | |
| *B62D 3/00* | (2006.01) | |

(52) U.S. Cl.
CPC .......... *B62D 21/11* (2013.01); *B60G 21/0551* (2013.01); *B62D 7/00* (2013.01); *B62D 7/226* (2013.01); *B60G 2204/15* (2013.01); *B60G 2206/60* (2013.01); *B62D 3/00* (2013.01)

(58) Field of Classification Search
CPC ............ B60G 21/0551; B60G 2206/60; B60G 224/15; B62D 7/00; B62D 7/226; B62D 3/00; B62D 21/11; B62D 21/02
See application file for complete search history.

(56) References Cited

U.S. PATENT DOCUMENTS

| | | | | |
|---|---|---|---|---|
| 4,213,631 A | * | 7/1980 | Wilkerson | ........... B60G 15/068 280/86.752 |
| 5,280,957 A | * | 1/1994 | Hentschel | ............... B60G 3/20 280/124.109 |
| 5,833,026 A | * | 11/1998 | Zetterstrom | ........... B60G 3/202 180/360 |

(Continued)

FOREIGN PATENT DOCUMENTS

| | | |
|---|---|---|
| CN | 1484596 A | 3/2004 |
| CN | 104010922 B | 10/2016 |

(Continued)

OTHER PUBLICATIONS

German Search Report for German Application No. 10 2017 112 049.1, with partial English translation, dated Apr. 6, 2018, 9 pages.

*Primary Examiner* — Karen Beck
(74) *Attorney, Agent, or Firm* — RatnerPrestia

(57) ABSTRACT

A subframe for a rear axle of a motor vehicle includes a transverse structure and a steering device for wheels of the motor vehicle which are fastened to the rear axle. In the installed state of the subframe in the motor vehicle, the transverse structure extends in the transverse direction of the motor vehicle. The transverse structure includes an upper transverse structure element and a lower transverse structure element. The steering device is arranged between the upper transverse structure element and the lower transverse structure element.

10 Claims, 1 Drawing Sheet

(56) References Cited

U.S. PATENT DOCUMENTS

| | | | |
|---|---|---|---|
| 6,109,629 A | 8/2000 | Bortz et al. | |
| 6,866,295 B2 | 3/2005 | Ziech et al. | |
| 9,010,849 B2 | 4/2015 | Komiya et al. | |
| 2004/0046381 A1 | 3/2004 | Yoshida et al. | |
| 2009/0212548 A1* | 8/2009 | Frasch | B62D 21/11 280/785 |
| 2010/0276901 A1* | 11/2010 | Richardson | B60G 3/20 280/93.512 |
| 2015/0158529 A1 | 6/2015 | Leibl | |
| 2016/0347369 A1 | 12/2016 | Haselhorst | |
| 2017/0029029 A1 | 2/2017 | Chapple et al. | |
| 2018/0281860 A1* | 10/2018 | Tanaka | B62D 21/11 |

FOREIGN PATENT DOCUMENTS

| | | | | |
|---|---|---|---|---|
| DE | 1278855 B | 9/1968 | | |
| DE | 4129538 A1 | 3/1993 | | |
| DE | 19730404 A1 | 1/1999 | | |
| DE | 102004057176 A1 | 3/2006 | | |
| DE | 102016111231 A1 | 1/2017 | | |
| EP | 0441818 A1 | 8/1991 | | |
| EP | 2823976 B1 * | 5/2016 | | B60G 3/20 |
| EP | 3098141 A1 | 11/2016 | | |
| JP | 2009202857 A | 9/2009 | | |

\* cited by examiner

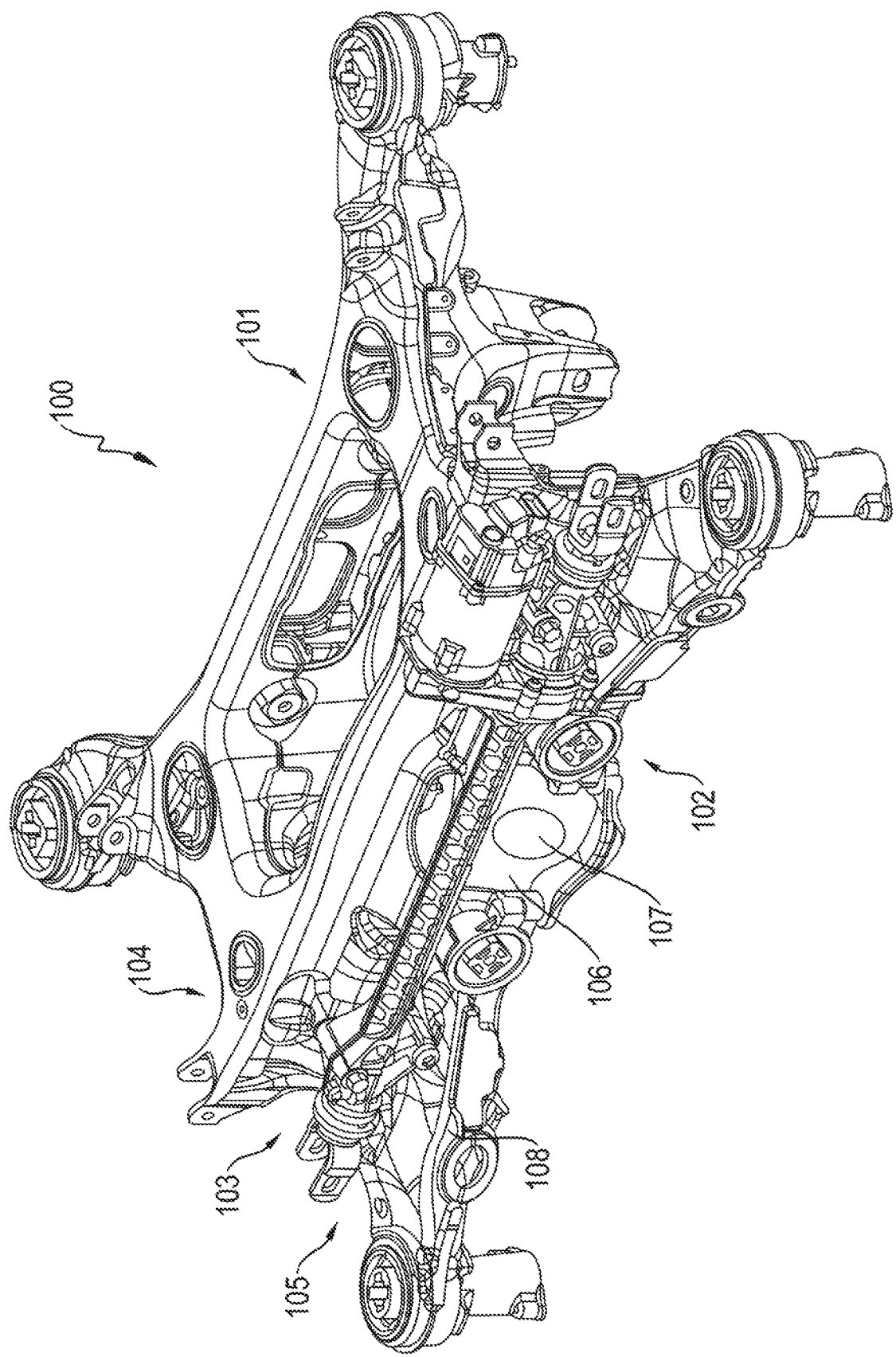

SUBFRAME FOR A REAR AXLE OF A MOTOR VEHICLE

CROSS-REFERENCE TO RELATED APPLICATION

This application claims priority to German Patent Application No. DE 10 2017 112 049.1, filed Jun. 1, 2017 which is incorporated by reference herein in its entirety.

FIELD OF THE INVENTION

The present invention relates to a subframe for a rear axle of a motor vehicle.

BACKGROUND OF THE INVENTION

Subframes are known from the prior art. The body-side articulation points of the wheel suspensions are fastened thereto. In addition, the engine, the gearbox, the steering mechanism and/or the differential can be fastened to the subframe. The subframe is connected to the body via rubber bearings or is screwed to the body.

JP 2009-202857 A, which is incorporated by reference herein, discloses a subframe having a steering means mounted thereon. Such a steering means is designed to change the toe of the rear wheels of the motor vehicle during cornering, with the result that the rear wheels support the steering movement.

The subframe has a transverse structure which is designed to transmit forces. As a result, a bending force acts on the transverse structure. If this bending force leads to deformations of the transverse structure, the functioning of the steering means can be compromised.

It would be desirable to reduce the risk of compromising the functioning of the steering means.

SUMMARY OF THE INVENTION

According to aspects of the invention, the subframe comprises a transverse structure and a steering means for wheels of the motor vehicle which are fastened to the rear axle. Here, in the installed state of the subframe in the motor vehicle, the transverse structure extends in the transverse direction of the motor vehicle. What is meant here by the transverse direction within the context of this description is in particular the direction which extends in the horizontal direction perpendicular to the direction in which the motor vehicle is moved as intended without a steering angle of the front wheels.

In this case, the transverse structure comprises an upper transverse structure element and a lower transverse structure element. When the motor vehicle is used as intended, the upper transverse structure element is arranged above the lower transverse structure element. It is possible here for the upper transverse structure element to be spaced apart from the lower transverse structure element in the longitudinal direction. What is meant here by the longitudinal direction within the context of this description is the direction in which the motor vehicle is moved as intended without a steering angle of the front wheels. The longitudinal direction thus extends in the horizontal direction and perpendicular to the transverse direction.

The steering means is arranged between the upper transverse structure element and the lower transverse structure element. If the upper transverse structure element is spaced apart from the lower transverse structure element in the longitudinal direction, the steering means can be arranged between the upper and the lower transverse structure element both in the vertical direction of the motor vehicle and in the longitudinal direction. However, it is also possible for the steering means to be arranged between the upper and the lower transverse structure element only in the vertical direction. In other words, the arrangement of the steering means relative to the transverse structure element in the longitudinal direction remains out of consideration in this case.

The arrangement of the steering means between the upper transverse structure element and the lower transverse structure element reduces the force acting on the steering means under a bending stress on the transverse structure. Thus, the risk of compromising the function of the steering means is reduced. The steering means is preferably arranged centrally between the upper transverse structure element and the lower transverse structure element in the vertical direction.

According to one embodiment of the invention, the upper transverse structure element and the lower transverse structure element can be designed to take up forces which occur in the driving mode of the motor vehicle. Since both transverse structure elements take up the occurring forces and the steering means is arranged between the transverse structure elements at least in the vertical direction of the motor vehicle, in the case of a bending deformation of the transverse structure elements the deformation of the steering means is reduced or even prevented.

According to one embodiment of the invention, the occurring forces can result in a bending stress on the upper transverse structure element and on the lower transverse structure element. The steering means is then arranged in the region of a neutral plane. The neutral plane can also be referred to as a neutral fiber. What is meant here by the neutral plane within the context of this description is in particular the plane which is loaded neither in tension nor in compression under the bending stress. If the steering means has a greater extent than the neutral plane, it is possible for only a part of the steering means to be arranged within the neutral plane. This part is preferably a central part of the steering means. The arrangement of the center of the steering means is particularly preferably in the neutral plane.

According to one embodiment of the invention, the lower transverse structure element can have a cutout for a cardan shaft of the motor vehicle. In this way, the lower transverse structure element can be used for taking up occurring forces without the functioning of the cardan shaft being compromised.

According to one embodiment of the invention, the lower transverse structure element can comprise a first component and a second component. The first component can comprise the cutout for the cardan shaft. The first component can be fastened to the second component. This design simplifies the mounting of the lower transverse structure element.

According to one embodiment of the invention, the second component can be fastened to longitudinal members of the motor vehicle. Reliable force dissipation through the lower transverse structure element is thus made possible.

According to one embodiment of the invention, a force flow of the forces taken up by lower transverse structure element in the driving mode of motor vehicle between the first component and the second component, and vice versa, can be possible.

According to one embodiment of the invention, the transverse structure can be designed as a front transverse structure. The subframe can comprise a rear transverse structure. In the installed state of the subframe in the motor vehicle, the rear transverse structure can be arranged behind the front transverse structure in the longitudinal direction and fastened to the longitudinal members. The steering means can be arranged on the front transverse structure. This is a preferred arrangement of the steering means for steering the wheels of the motor vehicle which are fastened to the rear axle.

According to one embodiment of the invention, the steering means can be designed as a central actuator. The central actuator can comprise an electric motor and a spindle drive and be designed for synchronously adjusting the toe of the wheels fastened to the rear axle.

The motor vehicle comprises a subframe according to one embodiment of the invention, the rear axle and the wheels which are fastened to the rear axle. In addition, the motor vehicle can comprise the cardan shaft and the longitudinal members.

BRIEF DESCRIPTION OF THE DRAWINGS

Further features and advantages of the present invention will become clear from the following description of a preferred exemplary embodiment with reference to the appended drawing.

The FIGURE shows a schematic perspective illustration of a subframe according to one embodiment of the invention.

DETAILED DESCRIPTION OF THE INVENTION

As shown in the FIGURE, the subframe 100 comprises a rear transverse structure 101, a front transverse structure 102 and a steering means 103. Here, the front transverse structure 102 comprises an upper transverse structure element 104 and a lower transverse structure element 105. The lower transverse structure element 105 comprises a first component 105 having a cutout 107 and a second component 108. The steering means 103 is designed, during cornering of the motor vehicle, to steer wheels which are fastened to the rear axle of the motor vehicle.

When the subframe 100 is installed in a motor vehicle, the front transverse structure 102 is exposed to a bending stress. Here, the steering means 103 are arranged between the upper transverse structure element 104 and the lower transverse structure element 105 in such a way that, under this bending stress, the neutral plane of the front transverse structure 102 extends centrally in the transverse direction through the steering means 103. Thus, the forces acting, on the steering means 103 are kept low. As a result, the risk that the functioning of the steering means 103 is compromised is reduced.

In the installed state of the subframe 100 in the motor vehicle, the cardan shaft of the motor vehicle projects through the cutout 107 in the first component 106. Thus, it is only through the cutout 107 that the arrangement of the lower transverse structure element 105 below the steering means 103 is made possible. In operation, a force flow from the first component 106 to the second component 108, and vice versa, is possible, with the result that occurring forces can be reliably dissipated through the lower transverse structure element 105.

What is claimed is:

1. A subframe for a rear axle of a motor vehicle, the subframe comprising:
   a transverse structure and a steering means for wheels of the motor vehicle which are fastened to the rear axle,
   wherein, in an installed state of the subframe in the motor vehicle, the transverse structure extends in a transverse direction of the motor vehicle,
   wherein the transverse structure comprises an upper transverse structure element and a lower transverse structure element,
   wherein the steering means is arranged between the upper transverse structure element and the lower transverse structure element,
   wherein the lower transverse structure element has a cutout for a cardan shaft of the motor vehicle.

2. The subframe as claimed in claim 1, wherein the lower transverse structure element is arranged at an elevation below the upper transverse structure, and the transverse structure further comprises a front transverse structure, and a rear transverse structure that is arranged behind the front transverse structure in a longitudinal direction of the motor vehicle,
   wherein the steering means is aligned with the front transverse structure in the longitudinal direction of the motor vehicle.

3. The subframe as claimed in claim 1, wherein the upper transverse structure element and the lower transverse structure element are configured to take up forces which occur in a driving mode of the motor vehicle.

4. The subframe as claimed in claim 1, wherein the forces result in a bending stress on the upper transverse structure element and on the lower transverse structure element, wherein the steering means is arranged in the region of a neutral plane.

5. The subframe as claimed in claim 1, wherein the lower transverse structure element comprises a first component and a second component, wherein the first component comprises the cutout for the cardan shaft, and wherein the first component is configured to be fastened to the second component.

6. The subframe as claimed in claim 5, wherein the second component is configured to be fastened to longitudinal members of the motor vehicle.

7. The subframe as claimed in claim 1, wherein a force flow of the forces taken up by the lower transverse structure element in the driving mode of the motor vehicle between the first component and the second component is possible.

8. The subframe as claimed in claim 1, wherein the steering means is a central actuator.

9. A motor vehicle, comprising the subframe as claimed in claim 1, wherein the wheels are fastened to the rear axle.

10. The subframe as claimed in claim 8, wherein central actuator comprises an electric motor and a spindle drive and is configured for synchronously adjusting a toe of the wheels fastened to the rear axle.

* * * * *